United States Patent [19]

Santoli

[11] 3,728,884
[45] Apr. 24, 1973

[54] HIGH PRESSURE TOOLING ASSEMBLY

[75] Inventor: Pasquale A. Santoli, Natrona Heights, Pa.

[73] Assignee: Allegheny Ludlum Industries Inc., Pittsburgh, Pa.

[22] Filed: July 16, 1971

[21] Appl. No.: 163,187

[52] U.S. Cl. ........................................ 72/273, 72/482
[51] Int. Cl. ............................................. B21c 25/00
[58] Field of Search ..................... 72/264, 281, 282, 72/273

[56] References Cited

UNITED STATES PATENTS 3,269,168  8/1966  Anderson ........................... 72/481 X
3,489,447  1/1970  Weyer ................................ 72/481 X Primary Examiner—Richard J. Herbst
Assistant Examiner—Robert M. Rogers
Attorney—Vincent G. Gioia et al.

[57] ABSTRACT

A stem holder that is moved back and forth has an axial socket in its front end that has a side wall circular in cross section and converging toward the front end of the holder. Disposed in the socket in engagement with its inner end wall is a stem that extends forward from the holder. The portion of the stem in the socket is cylindrical and spaced from the socket side wall. In this space there are at least three wedges that are curved transversely to fit against the stem and encircling wall. Each wedge has a threaded longitudinal passage through it, in which is mounted a screw that projects from the opposite ends of the wedge. The inner ends of the screws engage the inner end of the socket, and the outer ends of the screws are formed for turning them so that the wedges can be adjusted along the stem to adjust it laterally in the socket in order to align it with the member with which it cooperates.

4 Claims, 4 Drawing Figures

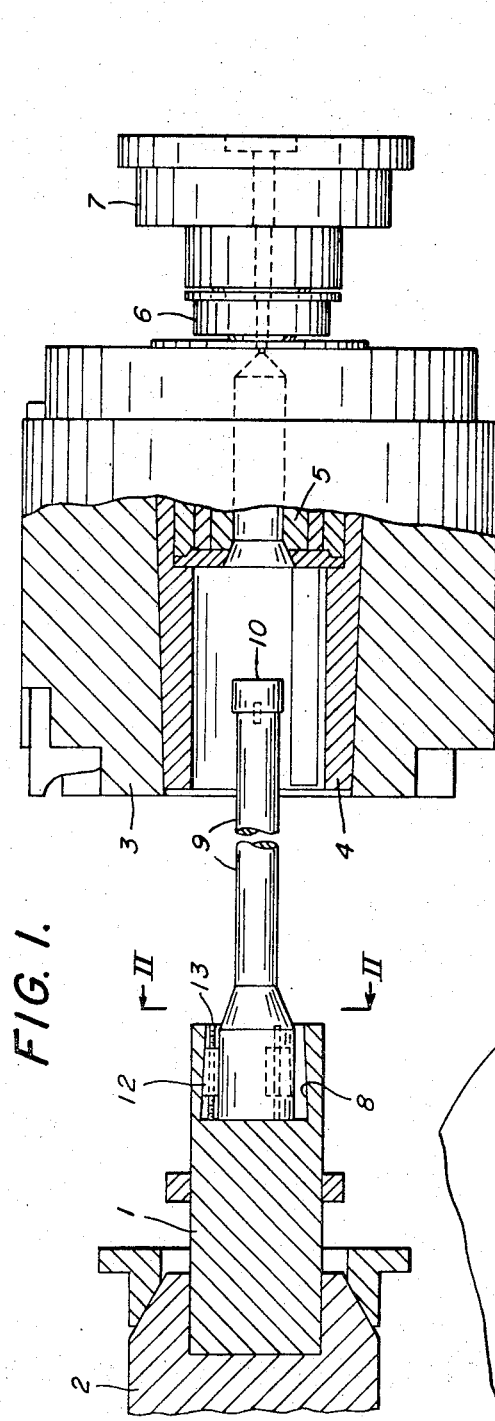
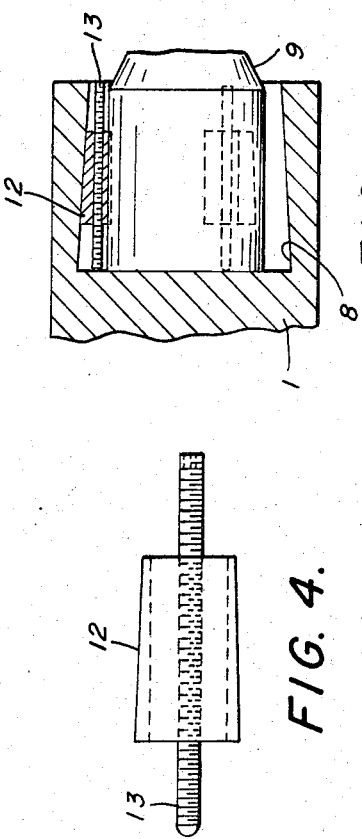
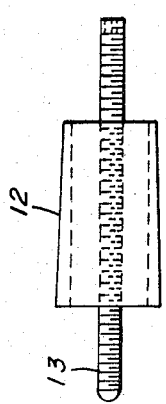
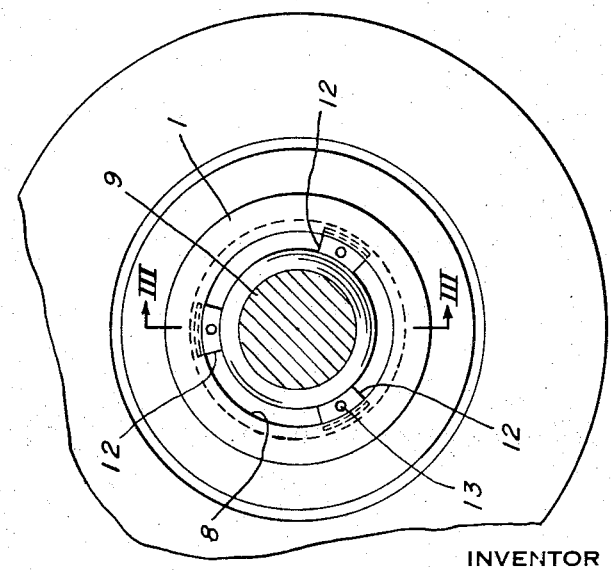

3,728,884

HIGH PRESSURE TOOLING ASSEMBLY

BACKGROUND OF THE INVENTION

In order for extrusion presses, hydraulic presses and the like to operate at extremely high pressures and high speed, it is necessary that the stems or rams be very accurately positioned. For example, a certain degree of misalignment between the ram or stem of a horizontal extrusion press and the billet container liner is inherent in such presses. This misalignment must be corrected, especially if the press is to operate at high speed and at extremely high pressure, in order to prevent failure of the stem or other damage to the press. Nominal stem compressive pressures as high as 300 ksi for direct extrusion of metals permit a significant increase in reduction ratio, a reduction in billet temperature and improvement of the product. The lower billet temperature results in improved dimensional control over extrusion length.

It is an object of this invention to provide a high pressure tooling assembly, in which a stem can be adjusted laterally in a stem holder to position the stem very accurately. Another object is to produce correct alignment between the stem of a horizontal extrusion press and the billet container liner.

SUMMARY OF THE INVENTION

In accordance with this invention a reciprocating stem holder has an axial circular socket in its front end that converges forward. Disposed in this socket is a stem that extends forward from the stem holder. The portion of the stem in the socket is cylindrical and spaced from the socket side wall by at least three wedge-like shims, each of which is provided with a threaded longitudinal passage in which is mounted a screw that projects from the opposite ends of the wedge. The inner ends of the screws engage the inner end of the socket. By turning the outer ends of the screws, the wedges can be adjusted along the stem to adjust it laterally in the socket for aligning it with a member with which it is to cooperate.

The preferred embodiment of the invention is illustrated in the accompanying drawings, in which FIG. 1 is a fragmentary side view and partial longitudinal section of a horizontal extrusion press;

FIG. 2 is an enlarged cross section taken on the line II—II of FIG. 1;

FIG. 3 is a fragmentary longitudinal section taken on the line III—III of FIG. 2; and FIG. 4 is an enlarged plan view of an adjusting shim or wedge.

Referring to the drawings, a stem holder 1 is moved back and forth in a horizontal line by means of a stem bell 2 that is reciprocated in conventional manner by suitable hydraulically operated means (not shown). In front of the stem holder and spaced from it is a container 3 for a billet that is to be extruded. The passage through the container contains a liner holder 4 and a liner sleeve assembly 5. At the front end of this assembly there are the usual die holder 6 and die arm ring 7. The front end of the stem holder 1 is provided with an axial socket 8, in which the enlarged rear end of a stem 9 or extrusion ram is mounted in engagement with the inner end wall of the socket. The stem extends forward from the socket and carries a dummy block 10 on its front end.

It is a feature of this invention that the stem is mounted in the holder socket 8 in such a manner that the stem can be adjusted laterally therein to obtain perfect alignment with the container liner. Accordingly, the side wall of the socket is circular in cross section but it converges toward the front end of the holder. The portion of the stem in the socket, on the other hand, is cylindrical and has a diameter materially less than the diameter of the outer or smaller end of the socket. The stem is spaced from the side wall of the socket by means of at least three circumferentially spaced wedges 12 that serve as shims. The inner and outer surfaces of the wedges are curved transversely as shown in FIG. 2, to fit against the stem and socket side wall. Each wedge is about half as long as the socket, and the thickness of the wedge is such that when all of them are located about midway between the opposite ends of the socket they will engage both socket wall and stem. This allows the wedges to be moved lengthwise in either direction from their central position.

To adjust the stem laterally in the socket in order to align it with the container liner, the wedges are adjusted lengthwise. For this purpose, each wedge is provided with a central threaded longitudinal passage in which an adjusting screw 13 is mounted. The screw projects from both ends of the wedge, with the inner end of the screw engaging the inner end wall of the socket. The inner ends of the screws are preferably rounded and the inner end wall of the socket is nitrided to harden it. The outer ends of the screws are substantially flush with the front face of the stem holder and are provided with hexagonal sockets for receiving a wrench for turning them.

In assembling the stem and stem holder the adjusting screws first are turned to move the wedges toward their inner ends. The wedges are then inserted as far as they will go into the socket and are held against its side wall while the stem is inserted between the wedges. Then the adjusting screws, which bear against the inner end wall of the socket, are turned to cause the wedges to move outwardly along them. All three wedges are moved out roughly the same distance to more or less center the stem in the socket. Then, working from that position, the wedges are adjusted in or out whatever distance is necessary in order to obtain the proper alignment of the stem with the container liner. It will be realized that in order to move one or two wedges outwardly along the stem, the remaining wedge or wedges must be moved inwardly to permit the stem to move laterally in the socket. Since reversing the screws to move the wedges inwardly will merely move the screws outwardly away from the inner end of the socket without moving the wedged-in shims, the screws are first reversed to some extent and then their outer ends are tapped to drive them and the wedges inwardly until the screws again engage the inner end of the socket. If it is found that this inward movement of a wedge is too much, its screw can be turned in the direction to drive the wedge back out along the stem the distance necessary for properly aligning the stem with the liner.

An extrusion press provided with the means disclosed herein for exact alignment of stem and container liner can be operated safely at high speed and extremely high pressures. The adjustable shims are simple in construction but allow the stem to be adjusted laterally in the socket minute distances to obtain a very high degree of accuracy.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A high pressure tooling assembly comprising a stem holder adapted to be moved back and forth and having an axial socket in its front end, the side wall of the socket being circular in cross section and converging toward the front end of the holder, a stem disposed in said socket in engagement with its inner end wall and extending forward from the holder, the portion of the stem in the socket being cylindrical and spaced from said socket side wall, at least three wedges in the socket spaced around the stem, the wedges being curved transversely to fit against the stem and socket side wall, each wedge having a threaded longitudinal passage through it, and a screw mounted in each of said passages and projecting from the opposite ends thereof, the inner ends of the screws engaging the inner end wall of the socket, and the outer ends of the screws being formed to be turned, whereby the wedges can be adjusted along screws and the stem to adjust the stem laterally in the socket.

2. A tooling assembly according to claim 1, in which each wedge is about half as long as said socket.

3. A tooling assembly according to claim 1, in which the inner end wall of the socket is hardened.

4. A tooling assembly according to claim 1, in which said stem is the horizontal ram of an extrusion press.

* * * * *